US012560917B2

(12) United States Patent
Yoshimura et al.

(10) Patent No.: US 12,560,917 B2
(45) Date of Patent: Feb. 24, 2026

(54) INFORMATION PROCESSING APPARATUS, PLANT CONTROL METHOD, AND NON-TRANSITORY COMPUTER-READABLE RECORDING MEDIUM

(71) Applicant: YOKOGAWA ELECTRIC CORPORATION, Tokyo (JP)

(72) Inventors: Eirou Yoshimura, Tokyo (JP); Kan-E Kuriyama, Tokyo (JP); Isao Hirooka, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 353 days.

(21) Appl. No.: 18/174,739

(22) Filed: Feb. 27, 2023

(65) Prior Publication Data

US 2023/0315067 A1 Oct. 5, 2023

(30) Foreign Application Priority Data

Mar. 30, 2022 (JP) ................................. 2022-057213

(51) Int. Cl.
G05B 19/418 (2006.01)

(52) U.S. Cl.
CPC ... G05B 19/41865 (2013.01); G05B 19/4183 (2013.01); G05B 19/41885 (2013.01)

(58) Field of Classification Search
None
See application file for complete search history.

(56) References Cited

U.S. PATENT DOCUMENTS

| | | | |
|---|---|---|---|
| 2002/0013908 A1 | 1/2002 | Nishihata | |
| 2018/0314243 A1* | 11/2018 | Fujita | G05B 13/0265 |
| 2021/0092173 A1 | 3/2021 | Nixon et al. | |
| 2021/0096541 A1 | 4/2021 | Sayyarrodsari et al. | |
| 2021/0343098 A1 | 11/2021 | Schlacks, IV et al. | |
| 2021/0397174 A1 | 12/2021 | Thomsen et al. | |
| 2023/0259112 A1* | 8/2023 | Cheon | G05B 23/0254 |

FOREIGN PATENT DOCUMENTS

| | | |
|---|---|---|
| JP | 2000084801 A | 3/2000 |
| JP | 2002032274 A | 1/2002 |
| JP | 2020064674 A | 4/2020 |
| JP | 2021033729 A | 3/2021 |
| JP | 2021057894 A | 4/2021 |

OTHER PUBLICATIONS

Office Action issued in corresponding Japanese Patent Application No. 2022-057213, dated Feb. 20, 2024, with translation (6 pages).
Office Action issued in European Patent Application No. 23158870. 8, dated Jun. 26, 2025 (5 pages).
Office Action issued in corresponding Chinese Patent Application No. 202310179282.5, mailed Nov. 24, 2025, with translation (16 pages).

* cited by examiner

*Primary Examiner* — Sean Shechtman
(74) *Attorney, Agent, or Firm* — Osha Bergman Watanabe & Burton LLP

(57) ABSTRACT
An information processing apparatus includes: a processor that: acquires, from a device for an operation of a plant, data related to the operation of the plant; assigns attribute information indicating a state of the device to the acquired data; and operates the plant by using the data to which the attribute information is assigned.

5 Claims, 12 Drawing Sheets

| Time Stamp | PV | SV | Mode | AMOUNT OF CHANGE IN SETTING | SETTING FREQUENCY | SWITCH COUNT OF SETTING DIRECTION |
|---|---|---|---|---|---|---|
| 8/31/2021 4:50:00 PM | -0.33496 | 0 | MAN | 0 | 3621 | 1460 |

ATTRIBUTE INFORMATION → INDEX

HANDLING LEVEL: HIGH

HANDLING LEVEL: MEDIUM

HANDLING LEVEL: LOW

INFORMATION PROCESSING APPARATUS, PLANT CONTROL METHOD, AND NON-TRANSITORY COMPUTER-READABLE RECORDING MEDIUM

CROSS-REFERENCE TO RELATED APPLICATION

The present application claims priority to Japanese Patent Application No. 2022-057213 filed in Japan on Mar. 30, 2022. The contents of this application are incorporated herein by reference in their entirety.

BACKGROUND

Technical Field

The present invention relates to an information processing apparatus, a plant control method, and a non-transitory computer-readable recording medium.

Description of the Related Art

In various plants using petroleum, petrochemicals, chemical substances, gas, or the like, various measures are implemented in order to perform a safe operation. For example, a monitoring technology for monitoring various devices, such as equipment, devices, and sensors, that are used for operations of the plants, a simulation technology for predicting a state of each of the plants or calculating a control value for performing operation control of each of the plants by using actual measurement values or the like of various devices, and the like are known.

Patent Document 1: Japanese Laid-open Patent Publication No. 2020-064674

Patent Document 2: Japanese Laid-open Patent Publication No. 2021-057894

Patent Document 3: Japanese Laid-open Patent Publication No. 2002-32274

SUMMARY

According to one or more embodiments, an information processing apparatus includes a processor configured to acquire, from a device that is used for an operation of a plant, data related to the operation of the plant, assign attribute information indicating a state of the device to the acquired data, and perform the operation of the plant by using the data associated with each of the pieces of assigned attribute information.

According to one or more embodiments, a plant control method that causes a computer to execute a process including acquiring, from a device that is used for an operation of a plant, data related to the operation of the plant, assigning attribute information indicating a state of the device to the acquired data, and performing the operation of the plant by using the data associated with each of the pieces of assigned attribute information.

According to one or more embodiments, a non-transitory computer-readable recording medium stores therein a plant control program (or plant control instructions) that causes a computer to execute a process including acquiring, from a device that is used for an operation of a plant, data related to the operation of the plant, assigning attribute information indicating a state of the device to the acquired data, and performing the operation of the plant by using the data associated with each of the pieces of assigned attribute information.

DESCRIPTION OF THE EMBODIMENTS

Figure 1:
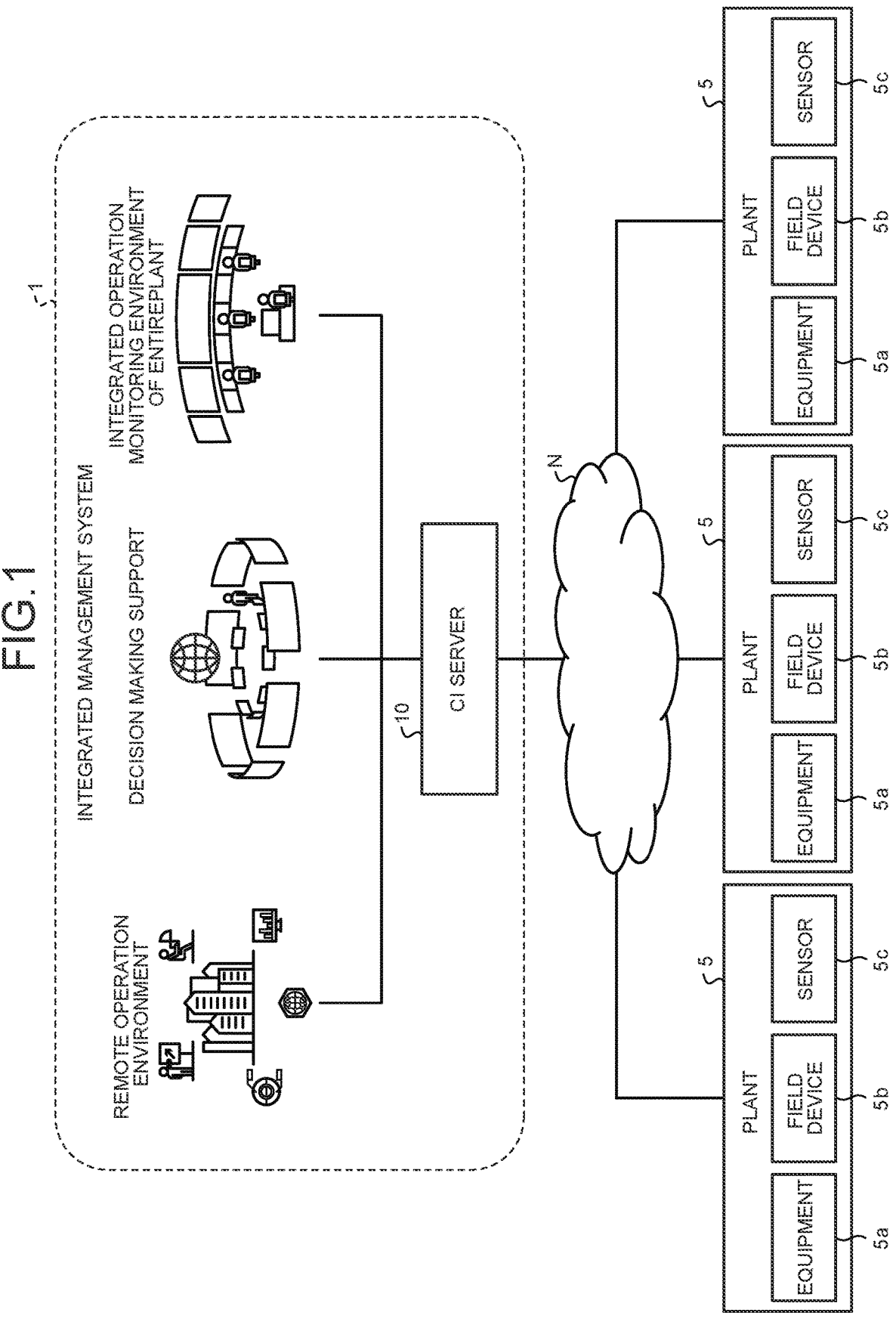
FIG. 1 is a diagram illustrating an example of the overall configuration of an integrated management system according to one or more embodiments.

Incidentally, in many plants, in order to perform a safe operation, information or the like that is used for monitoring items and a simulation is set in advance, and, in addition, data leakage, access control, and the like are appropriately managed on the basis of an advanced security policy. In contrast, in a plant, a review of an operation plan or the like is carried out due to various factors, such as an installation environment, a situation of supply and demand, and a variation in a raw material cost. Of course, due to the review of the operation plan or the like, a setting change of the monitoring item, variables of the simulation, or the like is performed, and the safe operation of the plant is maintained.

In this way, in the plant, there is a need to perform the safe operation while taking into consideration not only an internal factor, such as aged deterioration of a device or the like, but also an external factor; however, the technology described above is limited to monitoring previously set items or limited to a simulation performed by using data that is set in advance as an input, so that there may be a case of an insufficient state related to the safe operation following the situation of the plant, and there is thus still room for improvement.

One or more embodiments provide a technological improvement over conventional technologies. In particular, an information processing apparatus, a plant control method, and a non-transitory computer-readable recording medium according to one or more embodiments may efficiently and safely manage an operation of a plant in many aspects. This provides a practical, technological improvement over conventional technologies that would be readily appreciated by those skilled in the art. Further details regarding the various improvements and advantages will become apparent from the descriptions that follow.

Embodiments of an information processing apparatus, a plant control method, and a computer-readable recording medium will be described in detail below with reference to the accompanying drawings. Furthermore, the present invention is not limited to the embodiments. In addition, the same components are denoted by the same reference numerals and an overlapping description will be omitted. Each of the embodiments can be used in any appropriate combination as long as they do not conflict with each other.

First Example

Overall Configuration

FIG. 1 is a diagram illustrating an example of the overall configuration of an integrated management system 1 according to a first example. As illustrated in FIG. 1, the integrated management system 1 includes a CI server 10, and is connected to each of a plurality of plants 5 via a network N. Furthermore, various communication networks, such as a leased line, the Internet, or a long term evolution (LTE) network, may be used for the network N.

The integrated management system 1 is a system that integrally manages the plurality of plants 5, and is able to be implemented by a physical server, or is able to be implemented by a virtual machine or the like that uses a cloud system.

The CI server 10 is an example of an information processing apparatus that is connected to various devices included in each of the plants 5 and that integrally manages these devices. Specifically, the CI server 10 implements provision of a remote operation environment, provision of a service for a decision making support, provision of an integrated operation monitoring environment of the entire of the plants.

Furthermore, the remote operation environment provides, for each of the plants 5, a monitoring system that manages a state of the plant or the like, and provides a service, such as a report of an alarm or a notification to an operator. The decision making support simulates, for each of the plants 5, a state of the plant 5 and a control value in the plant 5, and provides a service, such as operation control of the plant 5 or a notification to an operator, on the basis of the simulation result. The integrated operation monitoring environment integrally monitors the plurality of plants 5, and provides a service, such as management of product materials produced by the plants, supply control, and cost management, in all of the plurality of plants 5. In this way, the CI server 10 is able to implement an alarm report to a designated user, transmission of various kinds of information, optimization of information management of the overall production activity, and a safe and effective operation support.

Each of the plants 5 is an example of various plants using petroleum, petrochemicals, chemical substances, gas, or the like, and includes a factory or the like that is provided with various facilities for obtaining product materials. Examples of the product materials include liquefied natural gas (LNG), a resin (plastic, nylon, etc.), and chemical substance products. Examples of the facilities include a factory facility, a machine facility, a production facility, an electric-generating facility, a storage facility, and a facility in a wellhead for mining petroleum, natural gas or the like.

Each of the plant 5 is constituted by using a distributed control systems (DCS) or the like that is not illustrated, and in which operation control of equipment 5a, a field device 5b, a sensor 5c or the like is performed. For example, the control system included in each of the plants 5 uses process data that is used in the respective plants 5, and performs various kinds of control on a control device, such as the field device 5b, that is installed in the equipment targeted for the control, an operation device that is associated with the equipment targeted for the control, or the like.

In addition, the equipment 5a includes, for example, an alarm device, such as a speaker, that outputs a warning, a conveying path that is used to convey the product material produced in the plant 5, and the like. The field device 5b includes a valve, a pump, a fan, and the like that are driven by a motor, an actuator, or the like. The sensor 5c includes a device, such as a pressure sensor, a temperature sensor, a flow rate sensor, a pH sensor, a velocity sensor, and an acceleration sensor, that acquires, detects, and measures, for example, a physical amount.

In addition, the data generated in the plant 5 and collected by the CI server 10 includes control data, such as a process value PV, a set value SV, a manipulation value MV, and the like. The process value PV is data indicating a state of a process performed in the plant 5. The process value PV is acquired by, for example, the associated field device 5b. An example of the process value PV includes a pressure, a temperature, a flow rate, a pH value, a velocity, and an acceleration.

The set value SV is data (target value) that indicates the target of the process value PV in the plant 5. The set value SV is given to the simulation that performs operation control of, for example, the plant 5, and is used for control of the plant 5. An example of the set value SV includes, similarly to the process value PV, a pressure, a temperature, a flow rate, a pH value, a velocity, and an acceleration. The manipulation value MV is data indicating a manipulation performed in the plant 5. The manipulation value MV is acquired from, for example, the associated field device 5b, or is provided to the field device 5b after the simulation has been performed. The field device 5b works in accordance with the provided manipulation value MV. An example of the manipulation value MV includes an amount of manipulation of the valve (for example, a degree of opening of the valve), an amount of manipulation of the pump, and an amount of manipulation of the fan.

With this system configuration, the CI server 10 acquires, from various devices, such as the equipment 5a, the field device 5b, and the sensor 5c, that are used for the operation of the plant 5, the data, such as a process value related to the operation of the plant or an output value of the device. Then, the CI server 10 assigns the attribute information that indicates the state of the device to the acquired data, and performs the operation of the plant 5 by using the data associated with each of the pieces of assigned attribute information.

In this way, the CI server 10 acquires data from the plant 5, assigns the attribute information to the acquired data, and provides a process or a service according to the attribute information, so that the CI server 10 implements central control of the plant 5 performed by using a cloud.

Functional Configuration

Figure 2:
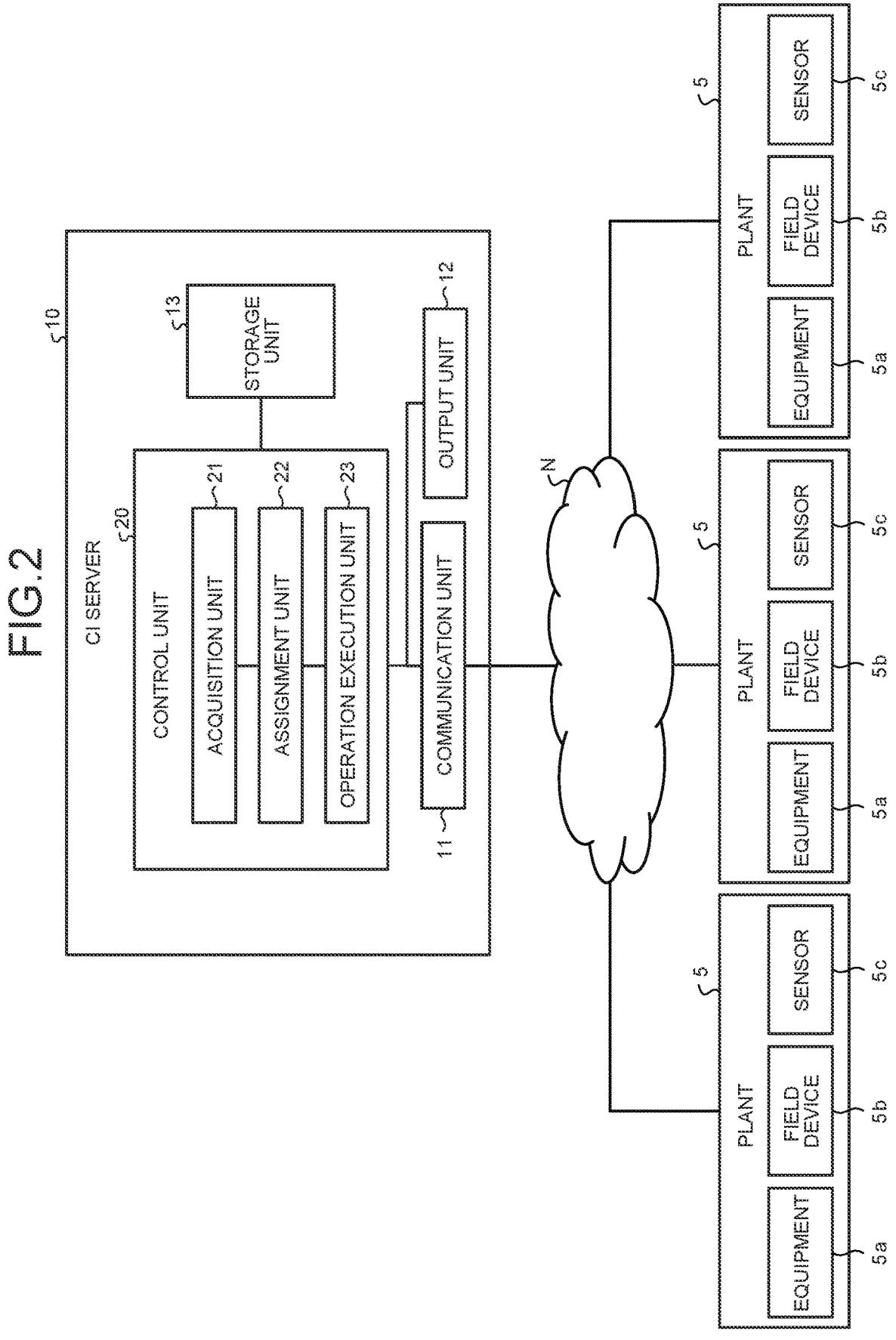
FIG. 2 is a functional block diagram illustrating a functional configuration of a CI server.

FIG. 2 is a functional block diagram illustrating a functional configuration of the CI server 10. Furthermore, here, as an example, a case in which the CI server 10 implements provision of a remote operation environment, provision of a service for a decision making support, provision of an integrated operation monitoring environment of the entire of the plants will be described; however, each of the services may be performed by individual devices.

As illustrated in FIG. 2, the CI server 10 includes a communication unit 11, an output unit 12, a storage unit 13, and a control unit 20.

The communication unit 11 is a processing unit that controls communication with another device and is implemented by, for example, a communication interface or the like. For example, the communication unit 11 receives data from the device included in each of the plants 5, and transmits the reception data to a predetermined provision destination.

The output unit 12 is a processing unit that performs output control of various kinds of information and is implemented by, for example, a display, a touch panel, or the like. For example, the output unit 12 is used to provide a remote operation environment, provides a monitoring screen for each of the plants 5, displays the reception data on the monitoring screen, and reports an alarm.

The storage unit 13 is a processing unit that stores therein various kinds of data, a program (or instructions) executed by the control unit 20, or the like and is implemented by, for example, a memory, a hard disk, or the like. The storage unit 13 stores therein setting information that is set in advance in order to perform data classification. For example, the storage unit 13 stores therein attribute information or the like that is set in accordance with each of the states of the devices.

The control unit 20 is a processing unit that manages the entire of the CI server 10, and is implemented by, for example, a processor or the like. The control unit 20 includes an acquisition unit 21, an assignment unit 22, and an operation execution unit 23. For example, the acquisition unit 21, the assignment unit 22, and the operation execution unit 23 are implemented by, for example, an electronic circuit included in the processor or implemented by a process or the like that is executed by the processor.

The acquisition unit 21 acquires, from various devices, such as the equipment 5a, the field device 5b, and the sensor 5c, that are used for the operation of the plant 5, control data, such as a process value PV, a set value SV, and a manipulation value MV, a monitoring value, and data including information on a monitoring alarm. For example, the acquisition unit 21 is also able to periodically acquire data from the various devices included in the plant 5, and may also receive the data that is transmitted by the various devices included in the plant 5. Furthermore, the acquisition unit 21 outputs the acquired data to the assignment unit 22.

The assignment unit 22 is a processing unit that assigns the attribute information indicating the state of the device to the data acquired by the acquisition unit 21. For example, the assignment unit 22 assigns security information, load information, information related to a change in the state of the device, or the like. Furthermore, the assignment unit 22 outputs the data to which the attribute information has been assigned to the operation execution unit 23.

The operation execution unit 23 is a processing unit that performs an operation of the plant 5 by using the data associated with each of the pieces of attribute information assigned by the assignment unit 22. For example, the operation execution unit 23 performs access control with respect to the data performed on the basis of the security information, simulation control performed on the basis of the load information, selection control of data performed on the basis of the change in the state of the device, or the like.

In the following, specific examples of data acquisition, attribute assignment, and plant control performed by the control unit 20 will be described with reference to FIG. 3 to FIG. 10.

Assignment of Attribute Information Performed Based on Operation Situation

Figure 3:
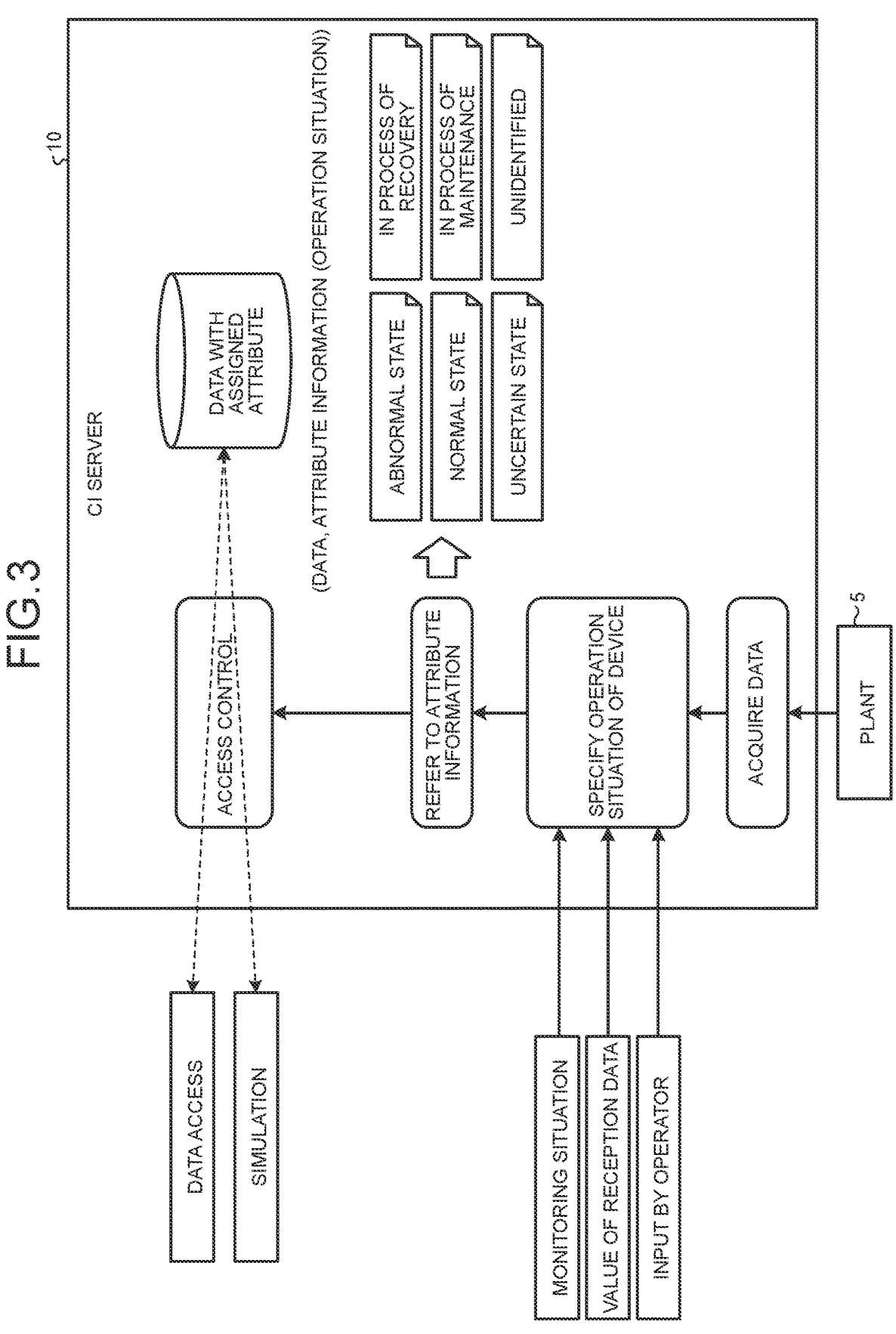
FIG. 3 is a diagram illustrating an assignment of attribute information performed based on an operation situation.

FIG. 3 is a diagram illustrating an assignment of the attribute information performed based on the operation situation. Specifically, the control unit 20 assigns, as the attribute information, the security information that is based on the operation situation of the device to the data. Then, the control unit 20 performs access control with respect to the data on the basis of the security information that is assigned to the data.

For example, as illustrated in FIG. 3, if the control unit 20 acquires the data from the device included in the plant 5, the control unit 20 specifies the operation situation of the device on the basis of a monitoring situation of the device, a value of the received data, an input received from an operator, or the like. Here, the control unit 20 specifies, for example, whether the device is in the course of normal operation, in the course of an abnormal operation, in the course of maintenance, or in an uncertain state that is not able to be specified, or the like. The control unit 20 assigns, as the attribute information, an abnormal state, a normal state, an uncertain state, in the course of recovery, in the course of maintenance, unidentified, or the like to the data.

After that, the control unit 20 uses the attribute information, and performs access control on the data at the time of failure from the outside. For example, the control unit 20 denies the external access to the data other than the data in the normal state. The control unit 20 outputs the data obtained at the time of abnormality, such as the abnormal state or the uncertain state, to an analysis terminal that analyzes an abnormal event, a simulation that simulates an abnormal event, or the like. In other words, the control unit 20 assigns, instead of a data value, a security level that is in accordance with the state of the transmission source of the data to the data, and performs control such that external provision is further prevented as the security level is higher, and the data is used for an internal process.

Assignment of Attribute Information Performed Based on Installation Location

Figure 4:
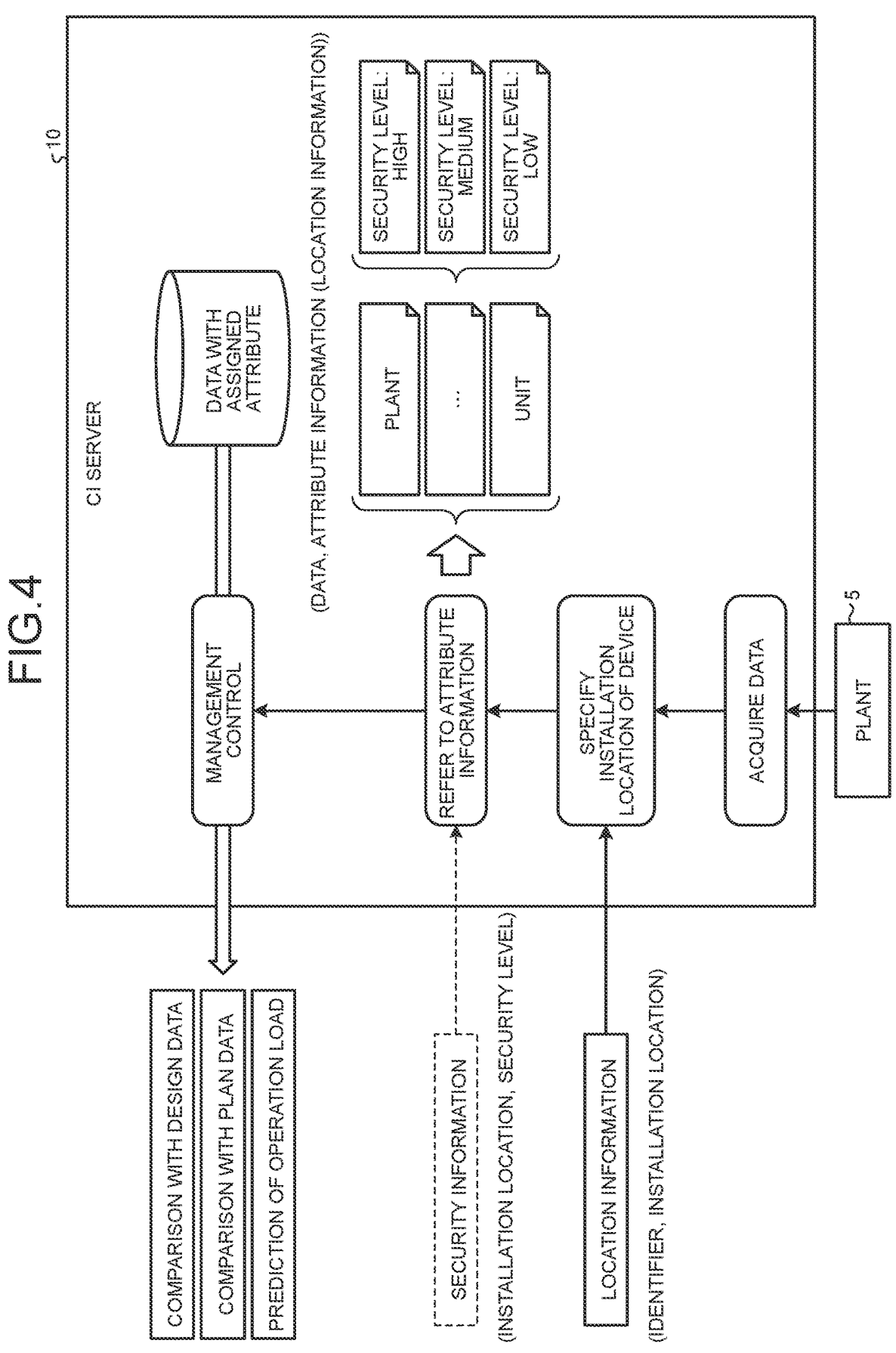
FIG. 4 is a diagram illustrating an assignment of attribute information performed based on an installation location.

FIG. 4 is a diagram illustrating an assignment of the attribute information performed based on the installation location. Specifically, the control unit 20 assigns, as the attribute information, the location information on the device corresponding to the data transmission source in the plant 5 to the data. Then, the control unit 20 performs, on the basis of the location information assigned to the data, control of an access to the data, provision destination of the data, a simulation performed by using the data, or the like.

For example, as illustrated in FIG. 4, if the control unit 20 acquires the data from the device included in the plant 5, the control unit 20 refers to design information or the like, and specifies the location of the device. The control unit 20 refers to, for example, the security information in which an installation location is associated with a security level, and assigns the attribute information to the data. For example, the control unit 20 assigns the attribute information by using three stages indicating high security, medium security, and low security. In more detail, the control unit 20 assigns a high security level to the data received from the device directly controlled by an online simulator and does not permit an access to the data from the outside.

Furthermore, the location information is able to be used without any change. For example, the control unit 20 is also able to control the provision destination of the data by using the location information and grouping the data in a unit (range) of an area, a unit, a tank, a reactor, or the like in the plant.

After that, the control unit 20 uses the attribute information and performs appropriate management control using the data. For example, by assigning the location information to the device of the data corresponding to transmission source, the control unit 20 establishes associations among physical equipment, a device, and logical management (P&ID), such as a control logic, a device name, and an ID. Then, the control unit 20 compares the comparison result of the associations with design data or operation data, so that the control unit 20 is able to perform an evaluation of the load applied during the operation by identifying, for example, an affected range of the load applied to the device in the case where the load is equal to or greater than a threshold. The control unit 20 is also able to report an alarm based on the obtained evaluation, and is also able to use the obtained result for failure precognition of the device, or the like.

In addition, the control unit 20 is also able to change the threshold of the alarm in accordance with the operation information by using the operation information and the operation load. For example, in the case where an operation performed in an uncertain state continues in a predetermined period of time or in the case where the state of the operation load continues in a period of time corresponding to the threshold, the control unit 20 is able to report an alarm before abnormality occurs. The control unit 20 is able to establish association with various kinds of control performed in the plant 5 by associating the device with P&ID performed by using the location information. In addition, the control unit 20 is able to improve the accuracy of prediction by performing the simulation that specifies control content or the like performed on a device located at a certain location.

Assignment of Attribute Information Performed Based on Load Information

Figure 5:
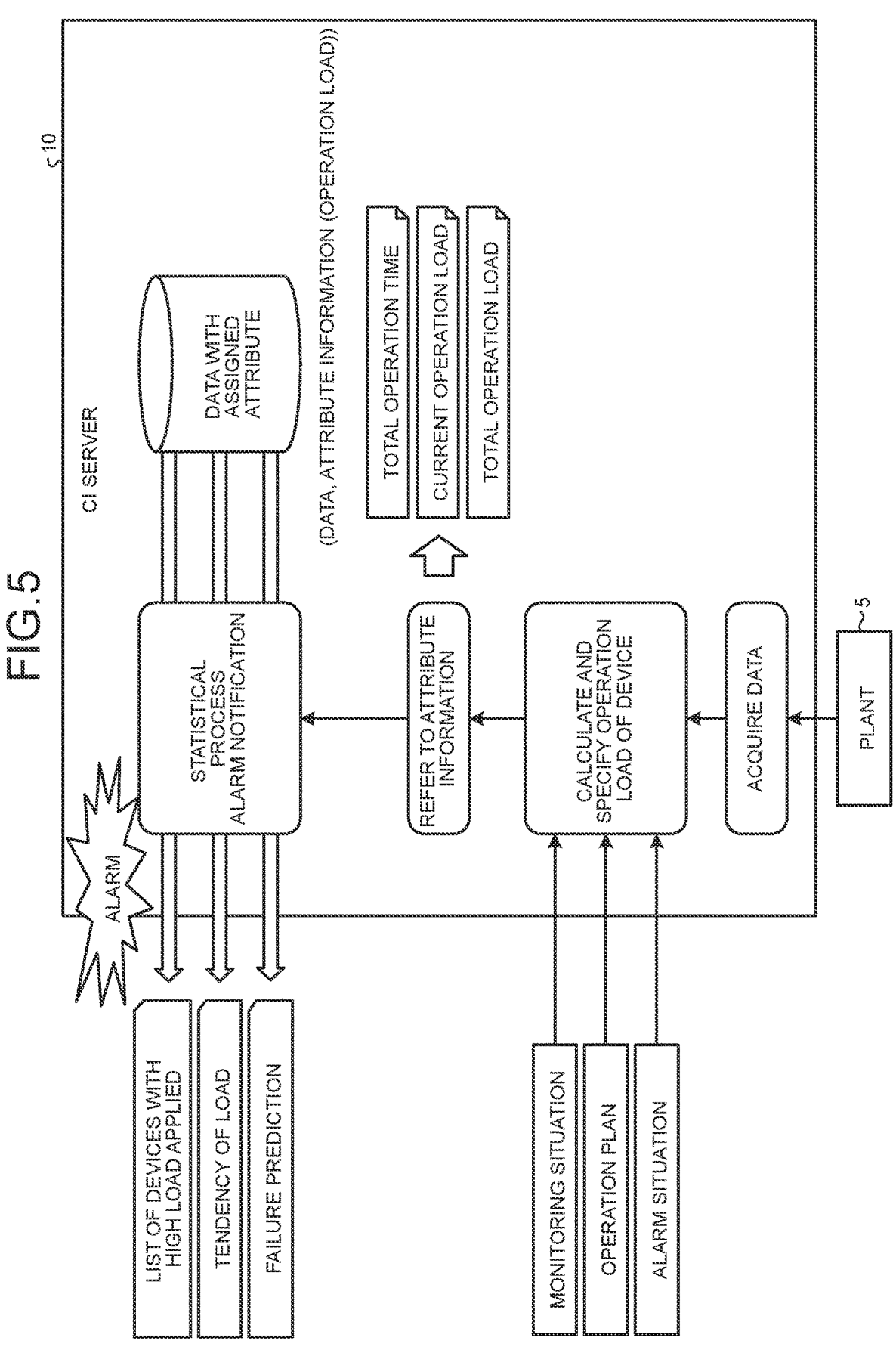
FIG. 5 is a diagram illustrating an assignment of attribute information based on load information.

FIG. 5 is a diagram illustrating an assignment of the attribute information performed based on the load information. Specifically, the control unit 20 assigns, to the data, the total operation time of the device corresponding to the data transmission source, the current operation load, or the load information related to the total operation load. Then, the control unit 20 controls the operation of the plant 5 on the basis of the load information assigned to each of the pieces of data.

For example, as illustrated in FIG. 5, if the control unit 20 acquires the data from the device included in the plant 5, the control unit 20 refers to a monitoring situation, an operation plan, an alarm situation, and the like, and calculates or specifies the operation load of the subject device. The control unit 20 assigns, as the attribute information, the total operation time of the device, the current operation load, or the total operation load to the data.

After that, the control unit 20 uses the attribute information, and performs a statistical process, an alarm notification, and the like. For example, the control unit 20 accumulates the devices in each of which a high load is applied, displays the list of the devices having a load equal to or greater than a threshold, and reports an alarm indicating a greater risk of an occurrence of failure. In addition, the control unit 20 accumulates the devices in each of which a load becomes high after a certain period of time, the devices in each of which a load does not become high even in a case of a long operation period of time, or the like, and is able to output a tendency of the load. As a result, an operator is able to make good use of failure precognition, a device replacement, or the like.

In addition, in a case of, for example, a thermal power plant (operated using a steam power technology or a gas turbine combined cycle technology), the control unit 20 determines the performance on the basis of an operation state value of a main device or an auxiliary device in a specific load zone (a power out of 100%, 75%, 50%, and 25%), so that it is possible to accurately and easily extract the data suitable for performance management by assigning the load information to each of the pieces of data, and it is thus possible to make good use of the failure precognition or design of a maintenance plan. Furthermore, the performance design or the performance management performed on the basis of the load information in this way is not limited to the thermal power plant, but may be used, as a target, for a process design, such as a heat balance or a material balance, with the assumption of several kinds of operation loads or a manufacturing amount.

Assignment of Attribute Information Performed Based on Operation Mode

Figure 6:
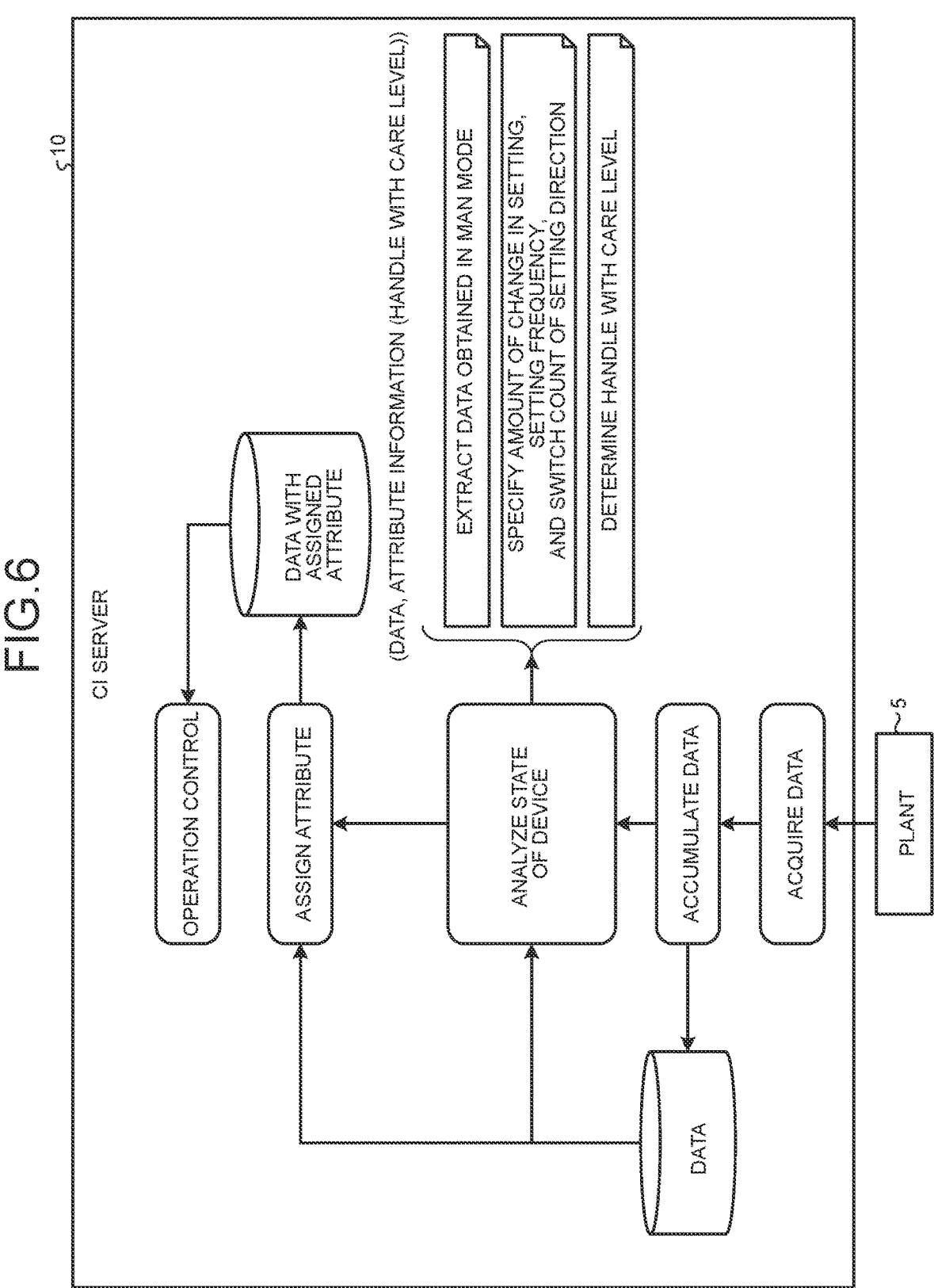
FIG. 6 is a diagram illustrating an assignment of attribute information performed based on an operation mode.

FIG. 6 is a diagram illustrating an assignment of the attribute information performed based on the operation mode. Specifically, each of the devices included in the plant 5 is usually operated by automatic control (Auto mode), but some devices are operated by manual control (MAN mode) due to various reasons, such as the state of the device, maintenance, troubleshooting, or a consideration stage of an automatic operation. Accordingly, the control unit 20 aggregates a control mode and a process set value (SV value) from the data obtained in the plant, and assigns the attribute information.

For example, as illustrated in FIG. 6, if the control unit 20 acquires the data, the control unit 20 accumulates the data and analyzes the state of the device by using the accumulated data. Specifically, the control unit 20 specifies a setting frequency, an amount of change, and a direction switch after collection of data associated with the MAN mode, and sets a "handle with care level" in accordance with a criterion that is prepared in advance.

Figure 7:
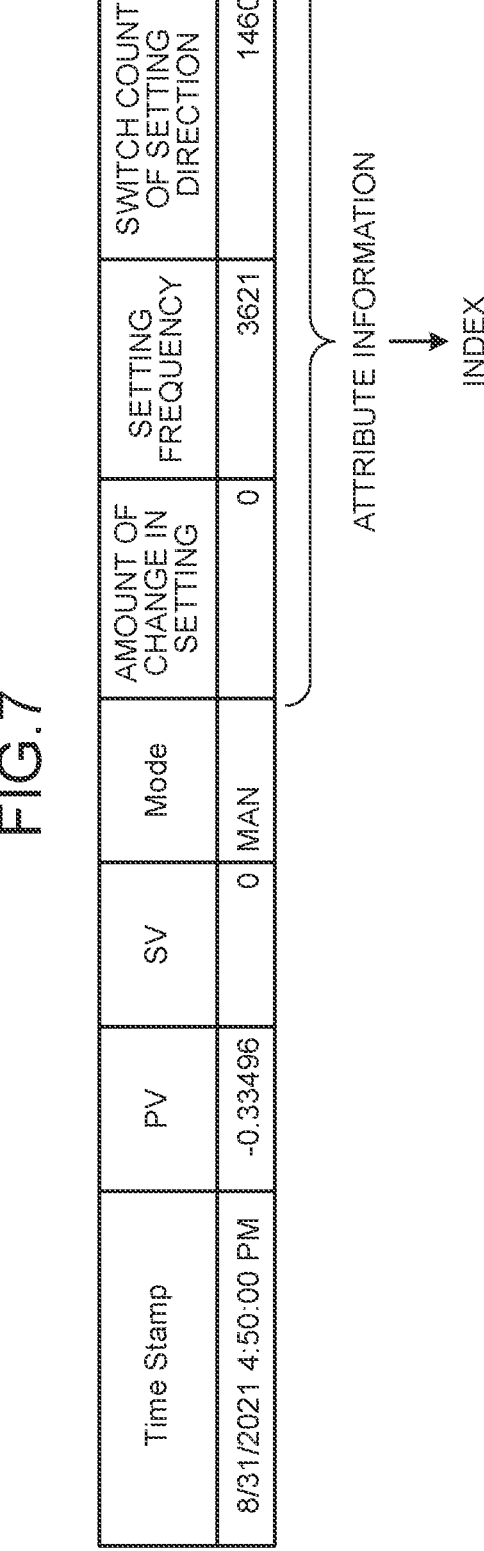
FIG. 7 is a diagram illustrating an example of data associated with a MAN mode.

FIG. 7 is a diagram illustrating an example of the data associated with the MAN mode. The data illustrated in FIG. 7 is an example of the PV value, and an example of the data on the device operated under the manual control in which "Mode=MAN" is set. The control unit 20 acquires an "amount of change in setting", a "setting frequency", and a "switch count of setting direction" that are included in the data illustrated in FIG. 7. The "amount of change in setting" indicates an amount of change in a set value, and indicates that a level affected to the process is greater as the amount of change in setting is greater. The "setting frequency" indicates the number of times manual setting has been performed, indicates that the number of management step of the process is greater as the setting frequency is increased, and indicates that it takes time and effort. The "switch count of setting direction" indicates the number of times of a change of data (target value) that indicates the target process value PV, and indicates that adjustment of the set value SV is more difficult process as the switch count of setting direction is increased.

Then, regarding each of the "amount of change in setting", the "setting frequency", and the "switch count of setting direction", the control unit 20 performs, for each data, comparison with the threshold, calculation of an amount of change from a previous time, or the like. As a result, regarding the data in which the amount of change is equal to or greater than the threshold, the control unit 20 notifies an operator or the like of an alarm or the like that indicates a possibility of an error of the manual control. Furthermore, regarding the data in which the amount of change is less than the threshold, the control unit 20 determines that a certain amount of a specific operation is available, and notifies a designer, an administrator, or the like indicating that an operation is able to be changed to the automatic control.

Figure 8:
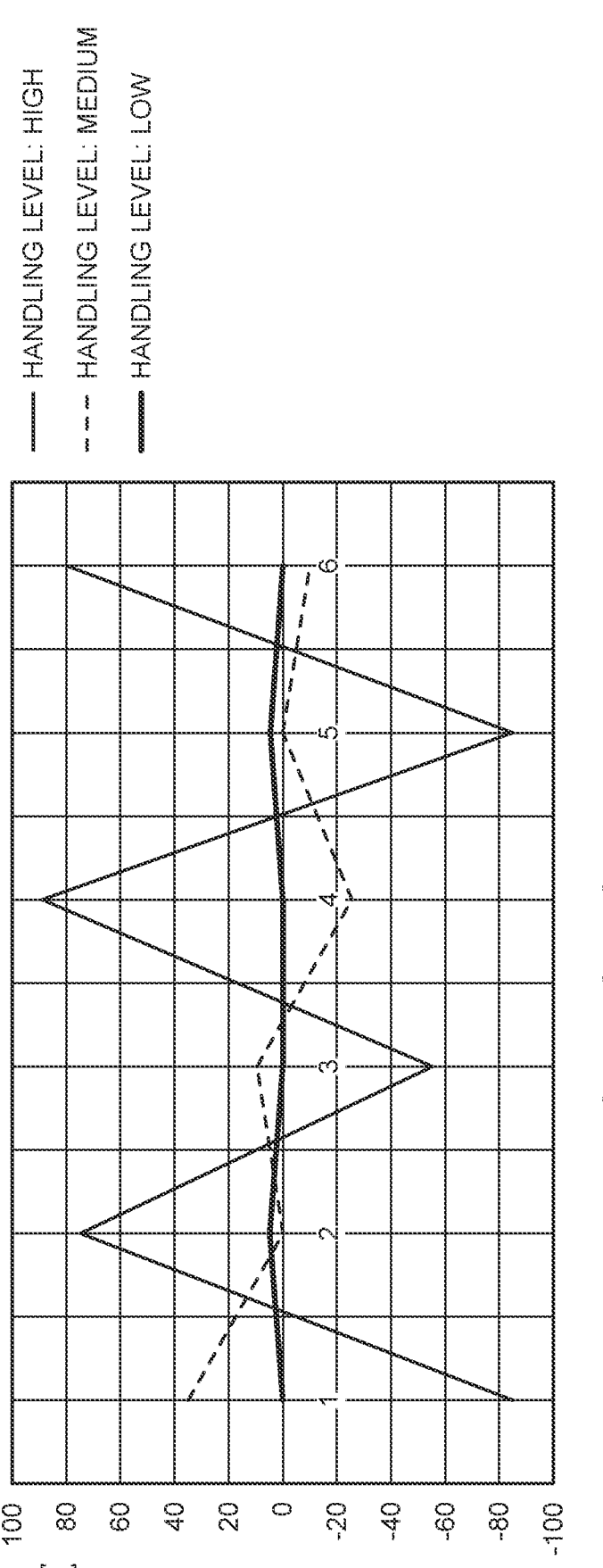
FIG. 8 is a diagram illustrating an example of determination of a handling level.

The control unit 20 is also able to index the "amount of change in setting", the "setting frequency", and the "switch count of setting direction" described above, and sets a "handling level" for each device or process. FIG. 8 is a diagram illustrating an example of determination of the handling level. As illustrated in FIG. 8, the control unit 20 specifies an increase or decrease in an amount of change in setting of certain data at a sampling period of, for example, 6 hours. In the example illustrated in FIG. 8, an increase or decrease in the amount of change in setting in each sampling period repeated six times.

The control unit 20 determines the handling level of the data as described above on the basis of the amount of change in setting. For example, if an increase or decrease in the amount of change in setting is transitioned at a level less than a first threshold, the control unit 20 determines that the "handling level is Low"; if an increase or decrease in the amount of change in setting is transitioned at a level equal to or greater than the first threshold and less than a second threshold, the control unit 20 determines that the "handling level is Medium"; and, if an increase or decrease in the amount of change in setting is transitioned at a level equal to or greater than the second threshold, the control unit 20 determines that the "handling level is High". In other words, the control unit 20 sets higher handling level as the process contains a greater amount of change in setting. Then, the control unit 20 determines the process or the device to be monitored as the process or the device has a higher handling level, and then, increases the monitoring level, and performs a decrease in the monitoring threshold, an increase in the monitoring frequency, or the like.

Furthermore, not only the "amount of change in setting" but also a "setting frequency" or a "switch count of setting direction" may be used, or a combination thereof may be used. For example, in the case where setting has been performed such that the setting frequency is regarded as important, the control unit 20 is also able to apply a weight (for example, by a factor of 1.2) to an amount of change in the setting frequency and determine the handling level.

Assignment of Attribute Information Performed Based on Change Index

Figure 9:
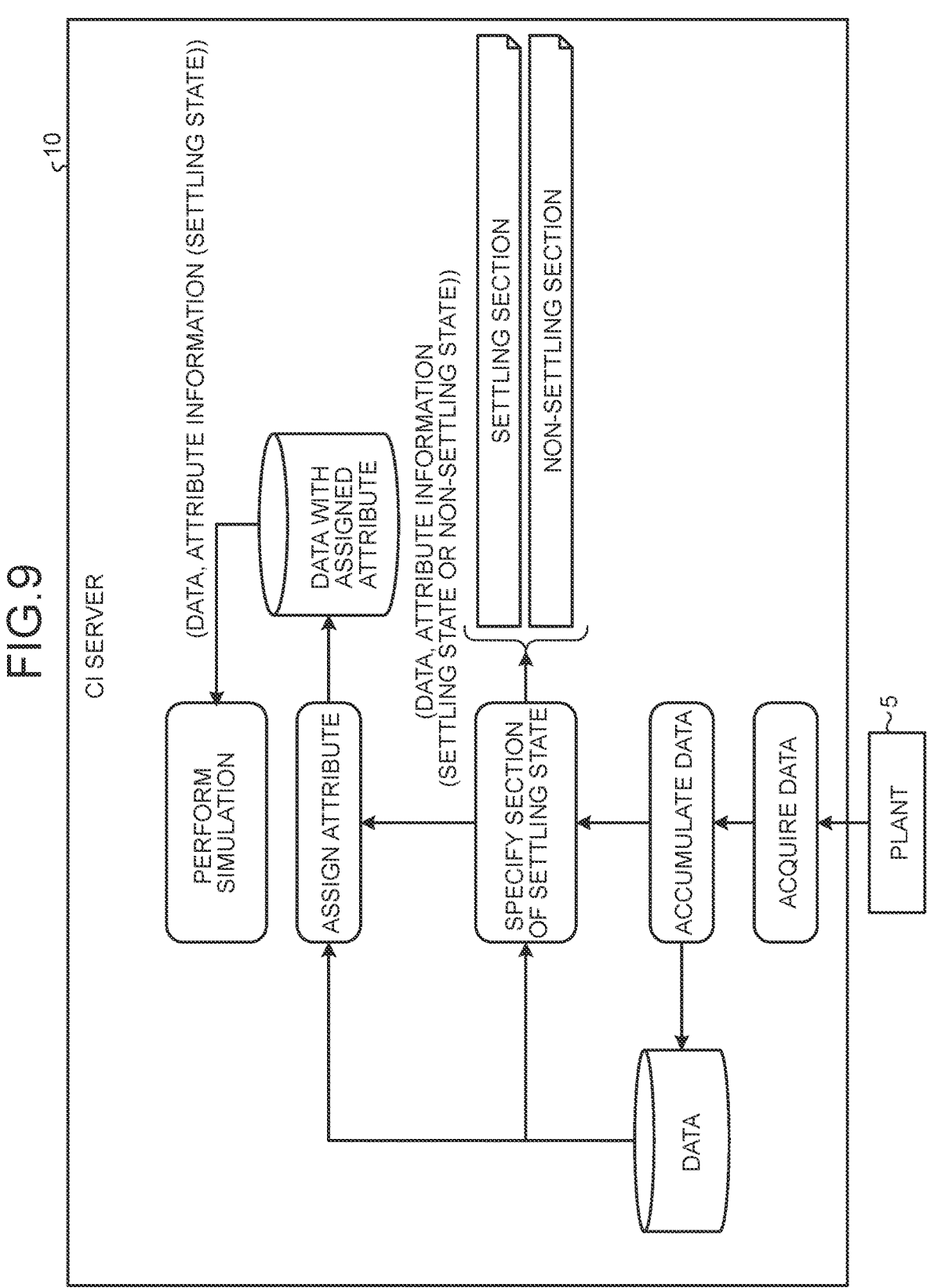
FIG. 9 is a diagram illustrating an assignment of attribute information performed based on a change index.

FIG. 9 is a diagram illustrating an assignment of the attribute information performed on the basis of the change index. Specifically, if data to which the type information indicating the type of the device has been assigned is acquired, the control unit 20 classifies each of the pieces of data by the type information. The control unit 20 assigns, for each of the pieces of classified type information, as the attribute information, the change index indicating a change from the past state to the data. The control unit 20 selects the data that is used for the operation of the plant 5 on the basis of the type information and the change index.

For example, as illustrated in FIG. 9, the control unit 20 accumulates data for each of the pieces of identification information for identifying, for example, data obtained in the MAN mode, data related to a certain process, a process value related to a certain device, or the like, and specifies, by using the accumulated data, a certain section in which the data is in a settling state. The control unit 20 assigns, as the attribute information, a settling section and non-settling section to the data included in each of the types that are accumulated in time series. After that, by using the data value included in the settling section, the control unit 20 uses the obtained data to perform an online simulation that predicts a future behavior of the plant 5 in real time.

In addition, the control unit 20 generates an approximate curve on the basis of each of the pieces of data acquired in a fixed period of time, and assigns slope information that indicates, as a change index, a slope of an approximate curve, the rate of change in the slope, or the like to each of the pieces of data. Furthermore, the control unit 20 is also able to input, to the simulation, the data in which the slope information is equal to or less than the threshold, and perform the operation of the plant by using the result of the simulation.

Figure 10:
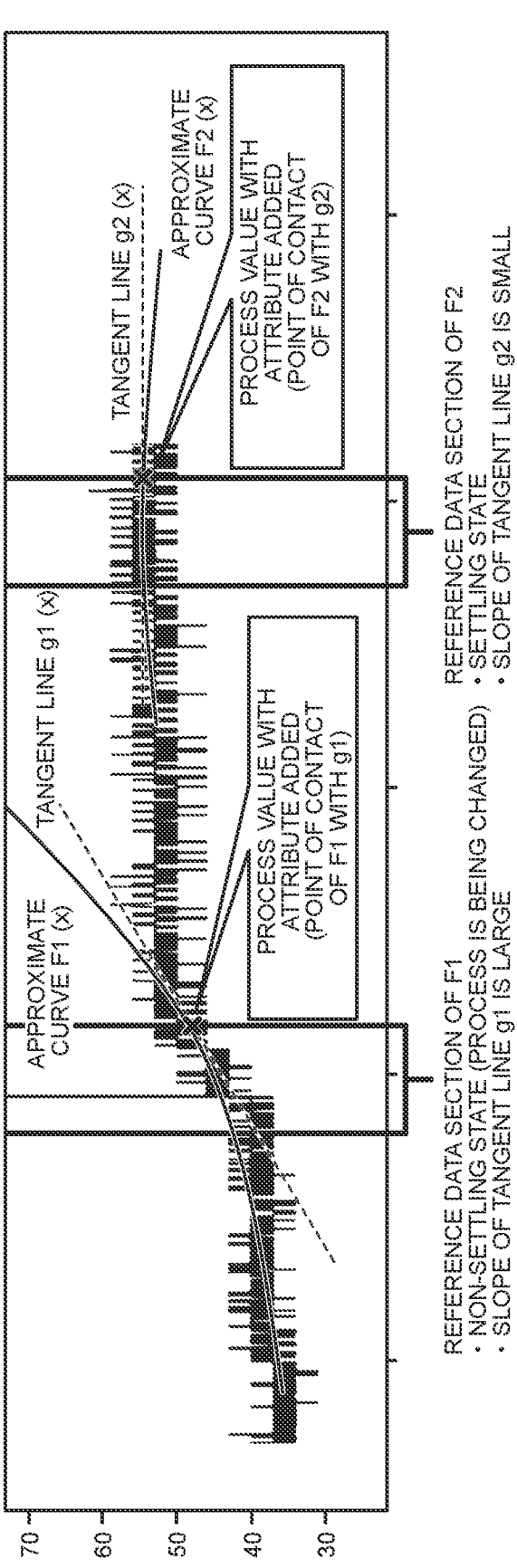
FIG. 10 is a diagram illustrating a calculation example of slope information.

FIG. 10 is a diagram illustrating an example of calculating slope information. FIG. 10 illustrates a change in a value of certain data in time series. As illustrated in FIG. 10, the control unit 20 calculates a slope of a tangent line (the first derivative $F'(x)$) and the rate of change of the slope of the tangent line (the second derivative $F'(x)$) in an approximate curve $F(x)$ based on past data obtained in a fixed period of time. Then, if the slope of the tangent line is equal to or less than the threshold (a value closer to zero) and the rate of change of the slope of the tangent line is equal to or less than the threshold (a value closer to zero), the control unit 20 determines that the process or the device is in the settling state.

For example, the control unit 20 determines that a reference data section associated with F1 illustrated in FIG. 10 is a non-settling state, in which the process is being changed, because the slope of a tangent line g1 is equal to or greater than the threshold and is large. In contrast, the control unit 20 determines that a reference data section associated with F2 illustrated in FIG. 10 is a settling state, in which the process is not changed, because the slope of a tangent line g2 is less than the threshold and is small. Then, the control unit 20 is able to improve these pieces of analytical accuracy by using the data included in the section that is associated with F2 and that is in the settling state as the original data for the online simulator or an equipment diagnosis.

Flow of Process

Figure 11:
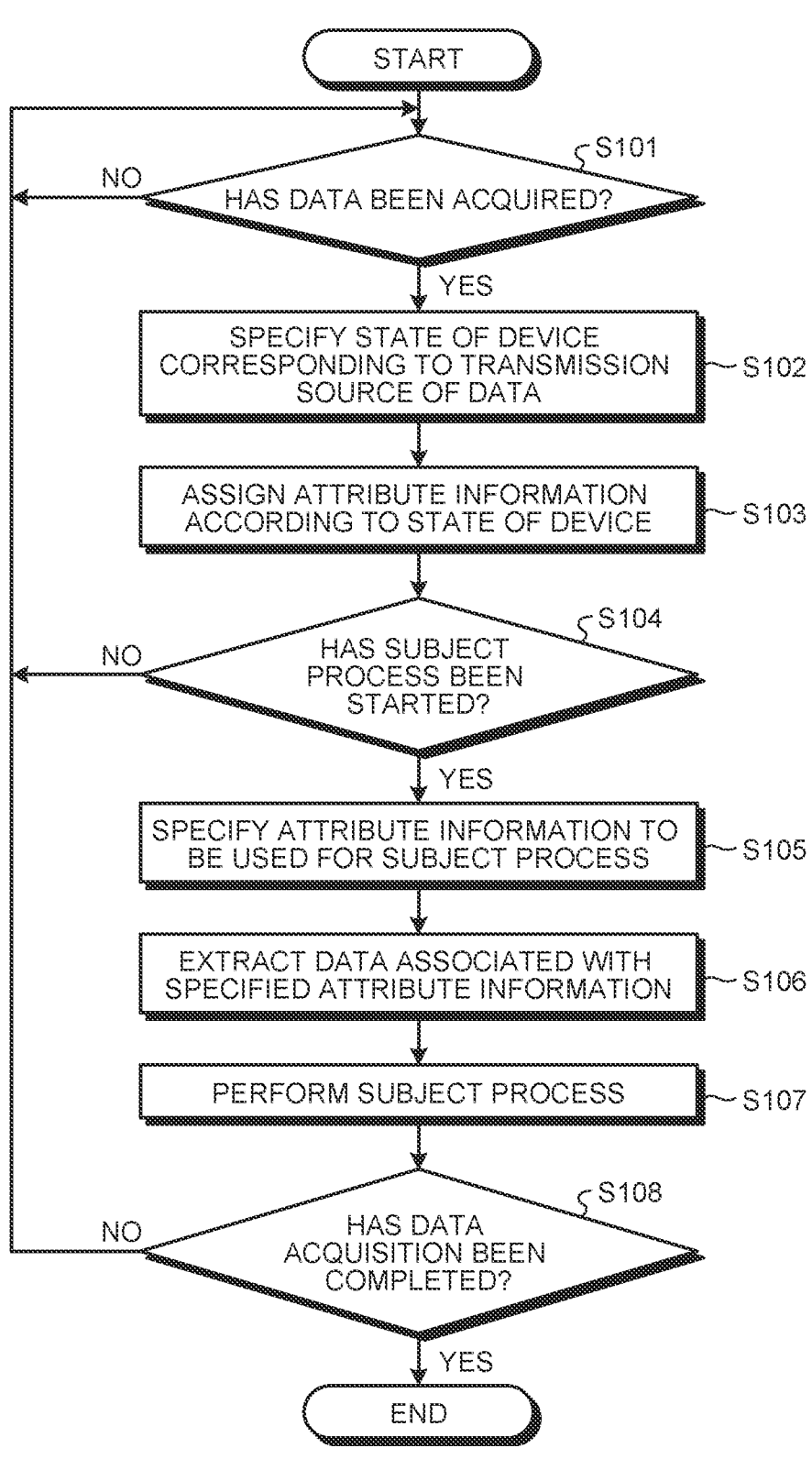
FIG. 11 is a flowchart illustrating the flow of a process according to one or more embodiments.

FIG. 11 is a flowchart illustrating the flow of the process according to the first example. As illustrated in FIG. 11, if the CI server 10 acquires or receives data (Yes at Step S101), the CI server 10 specifies the state of the device that is the transmission source of the data (Step S102).

Subsequently, the CI server 10 assigns the attribute information according to the state of the device to the data (Step S103). Here, if the CI server 10 does not start the subject process (No at Step S104), the CI server 10 repeats the process at Step S101 and the subsequent process. In contrast, if the CI server 10 starts the subject process (Yes at Step S104), the CI server 10 specifies the attribute information that is used for the subject process (Step S105).

Then, the CI server 10 extracts the data associated with the specified attribute information from the storage unit 13 or the like (Step S106), and performs the subject process (Step S107). Here, if the CI server 10 continues to acquire data (No at Step S108), the CI server 10 repeats the process at Step S101 and the subsequent processes, and, in contrast, if the CI server 10 ends the data acquisition (Yes at Step S108), the CI server 10 completes the process.

Effects (Technological Improvements)

As described above, the CI server 10 assigns, as the attribute information, the security information to the data on the basis of the installation location of the device or the operation situation of the device, and performs the access control on the data on the basis of the security information that is assigned to each of the pieces of data. Therefore, the CI server 10 is able to safely and efficiently manage the operation of the plant from various aspects while guaranteeing various kinds of security of the plant.

The CI server 10 assigns, as the attribute information, the total operation time of the device, the current operation load, or the load information related to the total operation load to the data, and performs control of the operation of the plant on the basis of the load information applied to each of the pieces of data. Therefore, the CI server 10 is able to provide the monitoring environment on the basis of a long term viewpoint in addition to a general short term viewpoint without performing a setting change of an existing system that is in operation.

The CI server 10 extracts the data obtained in the MAN mode as the attribute information, generates the change index, assigns the change index to the data, and selects the data used for the operation of the plant on the basis of the change index. Therefore, the CI server 10 is able to easily extract a control loop of the MAN mode that is difficult for handling in the operation of the plant, is able to encourage improvement by focusing on the control loop, and is able to implement a risk reduction in an operation and implement optimization of maintenance.

The CI server 10 aggregates the process values from the data included in the plant, and assigns the attribute information that indicates the settling state or the non-settling information as the attribute representing a change from the past state. Therefore, the CI server 10 is able to determine the data at the time of settling by using parameters, and is able to implement selection and state determination of the process in a manner that is easier and smaller computational load than a case of multivariate analysis or the like.

Other Embodiments

In the above explanation, a description has been given of the embodiments according to the present invention; however, the present invention may also be implemented with various kinds of embodiments other than the embodiments described above.

Value, etc.

The number of plant, the number of pieces of equipment, field devices, and sensors, the content of the integrated process, the number of security levels, the specific example of the attribute information, and the like described above in the embodiments are only examples and are able to be changed. Furthermore, the order of the processes of the flowchart described in the embodiments is also able to be changed as long as they do not conflict with each other.

System

The flow of the processes, the control procedures, the specific names, and the information containing various kinds of data or parameters indicated in the above specification and drawings can be arbitrarily changed unless otherwise stated. For example, the acquisition unit 21, the assignment unit 22, and the operation execution unit 23 may be constituted by different devices.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, all or any part of each of the processing functions performed by the each of the devices can be implemented by a CPU and by programs analyzed and executed by the CPU or implemented as hardware by wired logic.

Hardware

Figure 12:
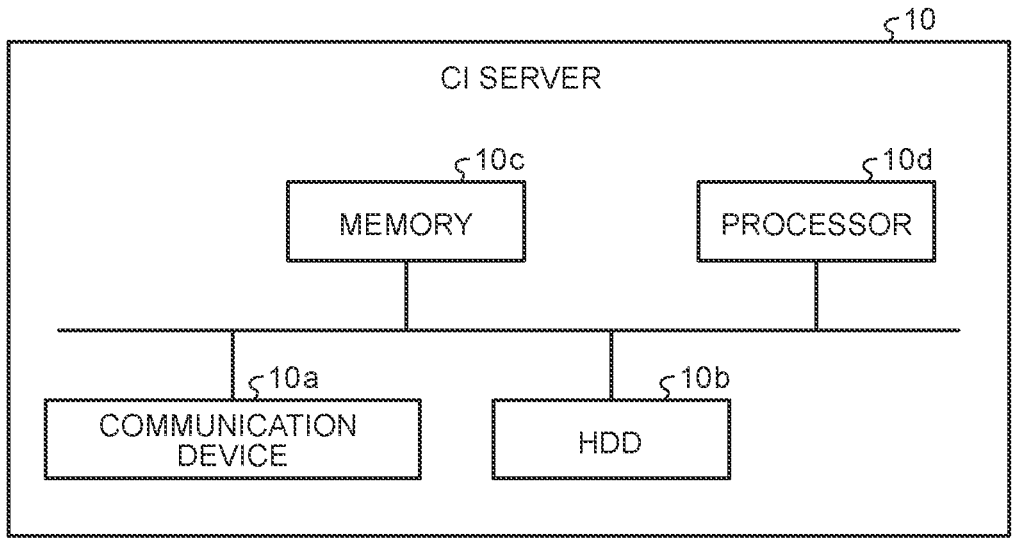
FIG. 12 is a diagram illustrating an example of a hardware configuration.

In the following, an example of a hardware configuration of a computer described in one or more embodiments will be described. FIG. 12 is a diagram illustrating an example of a hardware configuration. As illustrated in FIG. 12, the CI server 10 includes a communication device 10*a*, a hard disk drive (HDD) 10*b*, a memory 10*c*, and a processor 10*d*. Furthermore, each of the units illustrated in FIG. 12 is connected by a bus or the like with each other.

The communication device 10*a* is a network interface card or the like, and communicates with another server. The HDD 10*b* stores therein the programs and the DBs that operate the functions illustrated in FIG. 2.

The processor 10*d* operates the process that executes each of the functions described above in FIG. 2 or the like by reading the programs that execute the same process as that performed by each of the processing units illustrated in FIG. 2 from the HDD 10*b* or the like and loading the read programs in the memory 10*c*. For example, the process executes the same functions as those performed by each of the processing units included in the CI server 10. Specifically, the processor 10*d* reads, from the HDD 10*b* or the like, the programs having the same functions as those performed by the acquisition unit 21, the assignment unit 22, the operation execution unit 23, and the like. Then, the processor 10*d* executes the process for executing the same process as those performed by the acquisition unit 21, the assignment unit 22, the operation execution unit 23, and the like.

In this way, the CI server 10 is operated as an information processing apparatus that performs an information processing method by reading and executing the programs. Furthermore, the CI server 10 is also able to implement the same functions as those described above in one or more embodiments by reading the above described programs from a recording medium by a medium reading device and executing the read programs. In addition, the programs described in other embodiments are not limited to be executed by the CI server 10. For example, one or more embodiments may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

According to one or more embodiments, it is possible to safely and efficiently manage the operation of the plant in many aspects.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
   a processor that:

acquires, from a device for an operation of a plant, data related to the operation of the plant, where the data is assigned type information indicating a type of the device;

generates an approximate curve based on each of pieces of data acquired in a fixed period of time;

classifies the data by the type information;

assigns attribute information indicating a state of the device to the acquired data, where the attribute information includes slope information related to a slope of the approximate curve to each of the pieces of data;

reduces the acquired data to a subset of data in which:
the type information and the slope information have been assigned; and
the slope information is equal to or less than a threshold to a simulation;

inputs the subset of data into a multivariate simulation; and operates a field device in the plant selected from a valve, a pump, and a fan based on a result of the multivariate simulation related to the field device.

2. The information processing apparatus according to claim 1, wherein the information processing apparatus is a cloud server, and the processor further:
assigns, included in the attribute information, security information to the acquired data based on either an installation location of the device or an operation situation of the device, and
controls access to the data based on the security information.

3. The information processing apparatus according to claim 1, wherein the processor further:
assigns to the acquired data, included in the attribute information, total operation time of the device, a current operation load, and load information related to a total operation load, and
controls the operation of the plant based on the load information.

4. A plant control method that causes a computer to execute a process comprising:

acquiring, from a device for an operation of a plant, data related to the operation of the plant, where the data is assigned type information indicating a type of the device;

generating an approximate curve based on each of pieces of data acquired in a fixed period of time;

classifying the data by the type information;

assigning attribute information indicating a state of the device to the acquired data, where the attribute information includes slope information related to a slope of the approximate curve to each of the pieces of data;

reducing the acquired data to a subset of data in which:
the type information and the slope information have been assigned; and
the slope information is equal to or less than a threshold to a simulation;

inputting the subset of data into a multivariate simulation; and operating a field device in the plant selected from a valve, a pump, and a fan based on a result of the multivariate simulation related to the field device.

5. A non-transitory computer-readable recording medium having stored therein plant control instructions that cause a computer to execute a process comprising:

acquiring, from a device for an operation of a plant, data related to the operation of the plant, where the data is assigned type information indicating a type of the device;

generating an approximate curve based on each of pieces of data acquired in a fixed period of time;

classifying the data by the type information;

assigning attribute information indicating a state of the device to the acquired data, where the attribute information includes slope information related to a slope of the approximate curve to each of the pieces of data;

reducing the acquired data to a subset of data in which:
the type information and the slope information have been assigned; and
the slope information is equal to or less than a threshold to a simulation;

inputting the subset of data into a multivariate simulation; and operating a field device in the plant selected from a valve, a pump, and a fan based on a result of the multivariate simulation related to the field device.

*     *     *     *     *